Patented June 21, 1938

2,121,697

UNITED STATES PATENT OFFICE 2,121,697

SYNTHETIC RESINS

Ralph A. Jacobson, Wilmington, Del., assignor to E. I. du Pont de Nemours & Company, Wilmington, Del., a corporation of Delaware No Drawing. Application April 14, 1937, Serial No. 136,923

14 Claims. (Cl. 260—3)

This invention relates to new compositions of matter and more particularly to resinous materials.

Condensation products obtained by reacting formaldehyde with certain urea and barbituric acid derivatives in the presence of acid condensing agents, or without a condensing agent, have previously been reported. In this prior process only crystalline, non-resinous products are obtained.

This invention has as an object new and useful resinous materials. A still further object is a new process for making resins from formaldehyde and certain urea derivatives. Other objects will appear hereinafter.

These objects are accomplished by the following invention which comprises heating in the presence of an alkaline catalyst a mixture of aqueous formaldehyde and a cyclic urea derivative of the kind more fully described below, acidifying the reaction mixture, and evaporating water from the mass until the desired degree of dehydration has been obtained. On cooling, a solid resin is obtained the hardness and solubility of which depend upon and vary with the degree of dehydration and upon the chemical composition of the cyclic urea derivative employed.

The cyclic urea derivatives used in the practice of this invention are of the formula:

where R is a divalent radical having two and only two annular atoms (i. e., atoms forming a part of the chain), both of which are carbon. The cyclic urea derivatives used in my process are thus compounds having six ring members, examples of which are barbituric acid, of the formula

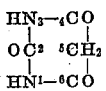

wherein R of the above general formula is —CH$_2$CO—; ethyl- and butylbarbituric acids, where R is —CH(C$_2$H$_5$)CO— and —CH(C$_4$H$_9$)CO— respectively; uracil, of the formula

in which R is —CH=CH—; hydrouracil in which R is —CH$_2$CH$_2$—; and 5-methylhydrouracil in which R is —CH(CH$_3$)CH$_2$—. In the naming of the uracil and barbituric acid derivatives, the six ring atoms are numbered as in the above formulae.

The following examples are illustrative of methods for carrying out my invention:

EXAMPLE I

Uracil-formaldehyde resin

A solution of 112 g. (1 mole) of uracil, 1 g. sodium hydroxide, and 300 cc. of 37% aqueous formaldehyde solution was refluxed gently for one hour. The solution was acidified with 5 cc. of acetic acid and evaporated on the hot plate until a thick syrup was obtained. The syrup was poured upon a plate and upon cooling solidified to a light-colored, hard transparent resin. The product was soluble in water and acetic acid but insoluble in acetone, ethanol, butyl acetate, toluene, and piperidine. When the syrup was heated longer on the hot plate the product was soluble in hot water but insoluble in cold water.

EXAMPLE II

5-Methylhydrouracil-formaldehyde resin

A solution of 100 g. of 5-methylhydrouracil, 1 g. of sodium hydroxide, and 300 cc. of 37% aqueous formaldehyde solution was refluxed gently for 1.25 hours. The solution was acidified with 10 cc. of acetic acid and evaporated on the hot plate until a thick syrup was obtained. On cooling, the syrup solidified to a light-colored brittle resin. The product was soluble in water and acetic acid but insoluble in ethanol, acetone, and butyl acetate.

EXAMPLE III

Barbituric acid-formaldehyde resin

A solution of 500 g. of barbituric acid and 65 cc. of 10% sodium hydroxide solution in 1500 cc. of 37% aqueous formaldehyde solution was refluxed gently for one hour. The mixture was acidified with 31 cc. of acetic acid, filtered and evaporated on the hot plate until a thick syrup was obtained. Upon cooling, the product solidified to a light yellow resin. The product was soluble in water, alcohol, and in isobutanol. It was only partially soluble in acetone. Films of the resin baked at 100° were hard but developed a slight surface tack upon standing.

Example IV

5-Ethylbarbituric acid-formaldehyde resin

A solution of 80 g. of 5-ethylbarbituric acid and 10 cc. of 10% sodium hydroxide solution in 240 cc. of 37% aqueous formaldehyde solution was refluxed gently for one hour. The mixture was acidified with 5 cc. of acetic acid, filtered and concentrated on the hot plate until a thick syrup was obtained. Upon cooling, the syrup solidified to an orange-yellow transparent resin. The latter was soluble in water, alcohol, and acetone but insoluble in isobutanol and butyl acetate.

Example V

5-Butylbarbituric acid-formaldehyde resin

A solution of 92 g. of 5-butylbarbituric acid and 10 g. of sodium hydroxide in 320 g. of 37% aqueous formaldehyde solution was refluxed for one hour. This solution was acidified with 5 cc. of acetic acid, filtered, and concentrated on the hot plate until a thick syrup was obtained. Upon cooling, the syrup solidified to a brittle transparent pale yellow resin. The latter was soluble in ethanol, butyl acetate, and acetone, partly soluble in isobutanol, and insoluble in water.

The uracil used in Example I may be prepared in one way as follows: To 1600 cc. of fuming sulfuric acid (15% $SO_3$) at 0° C. are gradually added 400 g. of urea. The addition requires about 2 hours and the temperature is maintained below 10° C. Into this mixture is rapidly introduced with stirring 400 g. of malic acid. The mass is stirred on the steam bath for ½ hour. The dark brown, clear solution is divided into two equal parts and each portion poured slowly with stirring into 2400 cc. of distilled water. The two portions are allowed to stand overnight. The crude uracil is filtered off and recrystallized from a large volume of water, a small amount of decolorizing carbon being also employed.

The 5-methylhydrouracil employed in Example II may be prepared in one way as follows: A mixture of 43 g. (0.5 mole) of methacrylic acid and 31 g. of urea is heated in an oil bath at 210–220° C. for one hour. The mixture is solid at the end of the reaction. Upon crystallization from hot water, white crystals of the desired compound melting at 257° C. are obtained.

Any six-member cyclic urea derivative of the general formula previously given may be employed in the present process. This formula includes barbituric acid, uracil, hydrouracil, and derivatives of these compounds in which one or more hydrogens attached to carbon are replaced by a hydrocarbon radical, a nitro group, an amino group, or a halogen atom. Suitable specific compounds include the following: 5-methylbarbituric acid, 5-isopropylbarbituric acid, 5-isoamylbarbituric acid, 5-n-heptylbarbituric acid, 5-allylbarbituric acid, 5-methallylbarbituric acid, 5-phenylbarbituric acid, 5-α-naphthylbarbituric acid, 5-cyclohexylbarbituric acid, 5-phenyl-5-ethylbarbituric acid, 5-phenyl-5-methylbarbituric acid, 5-methyluracil, 6-ethylhydrouracil, 5,6-dimethyluracil, 6-crotyluracil, 5-phenylhydrouracil, 5-nitrobarbituric acid, 5-chlorobarbituric acid, 5-aminobarbituric acid, 5-nitrouracil, 6-aminouracil, 5-bromouracil, 6-nitrohydrouracil, 5-aminohydrouracil, and 5-chlorohydrouracil. The substituent radical, if hydrocarbon, may be straight or branched chain; saturated or unsaturated; aliphatic, aromatic, or alicyclic, and if aromatic mononuclear or polynuclear.

If desired, part of the cyclic urea derivative may be replaced by urea itself to give a cyclic urea derivative-formaldehyde-urea resin. Thiourea may be similarly substituted for part of the cyclic urea derivative. By introducing varying amounts of phenol into the reaction mixture, a cyclic urea derivative-formaldehyde-phenol resin can be prepared. Such combinations lead to resins having a wide range of properties.

In place of aqueous formaldehyde it is possible to use paraformaldehyde although in this case a solvent or diluent such as water, alcohol, methanol, acetone, ethyl acetate or benzene becomes desirable. Gaseous formaldehyde can also be used in lieu of aqueous formaldehyde, conveniently by passing it into a solution or suspension of the cyclic urea derivative in a suitable liquid medium such as water, alcohol, acetone or ethyl acetate.

The proportions of the cyclic urea derivative to formaldehyde can be varied over a wide range. It is generally preferable to use a relatively large excess of formaldehyde over the theoretical amount to compensate for that which is lost during refluxing. If care is taken to avoid loss, however, such as by carrying out the reaction in a closed system, mole ratios of the aldehyde to cyclic urea derivative as low as 2:1 can be used.

As a catalyst, I may use any inorganic alkali, such as alkali and alkaline earth metal hydroxides, oxides, and carbonates. Suitable specific compounds are sodium, potassium, caesium, calcium and strontium hydroxides; sodium and potassium carbonates and bicarbonates; and calcium oxide. Preferably the catalyst is an alkali metal hydroxide. In general from 0.05% to 2% of catalyst based upon the weight of the cyclic urea derivative is satisfactory, although proportions outside this range are not precluded.

It is convenient to use glacial acetic acid for acidification of the reaction mixture as illustrated in the examples, but other acids may be used instead, e. g. tartaric, citric, oxalic, boric and even strong mineral acids such as hydrochloric, sulfuric, and phosphoric. The amount of acid used for acidification of the reaction mixture is preferably such as to make the reaction mixture only slightly acid, although larger amounts of acid can be added without injury to the product.

The reaction temperatures shown in the examples are not limiting, and the process may, with suitable adjustment of other conditions, be operated at temperatures of from 50° C. to 150° C. The refluxing temperature of the reaction mixture when aqueous formaldehyde is used is the most convenient temperature for carrying out the reaction.

While the present process is most conveniently carried out as a rule at atmospheric pressure, it is possible, with appropriate adjustment of other conditions, to operate at pressures of from 0.1 to 10 atmospheres. Reduced pressures are particularly useful in the latter stages of the process to facilitate removal of water.

My new resinous compositions are useful for a variety of purposes such as sizing agents for paper, ingredients of coating and impregnating compositions, adhesives, and as modifying agents for other synthetic resins. By controlling the amount of dehydration and by varying the cyclic urea derivative employed, the hardness of the resins and their solubility in water and organic solvents can be varied over such a wide range as to make them particularly valuable for a great variety of uses.

As many apparently widely different embodiments of this invention may be made without departing from the spirit and scope thereof, it is to be understood that I do not limit myself to the specific embodiments thereof except as defined in the appended claims.

I claim:

1. In a process for making resins the steps comprising heating in the presence of an alkali condensation catalyst a mixture of formaldehyde and a six-membered cyclic urea derivative, acidifying the reaction mixture, and evaporating water from the resulting product, said urea derivative having the formula

where R is a divalent radical having two and only two atoms in the ring of atoms forming the urea derivative, both of said atoms being carbon atoms.

2. The process set forth in claim 1 in which the catalyst is an alkali metal hydroxide.

3. The process set forth in claim 1 in which the temperature is from 50° C. to 150° C.

4. The resinous reaction product of resin-forming reactants consisting of formaldehyde and a six-membered cyclic urea derivative having the formula

where R is a divalent radical having two and only two atoms in the ring of atoms forming the urea derivative, both of said atoms being carbon atoms.

5. The process set forth in claim 1 in which said urea derivative is a uracil.

6. The process set forth in claim 1 in which said urea derivative is a barbituric acid.

7. The resinous reaction product set forth in claim 4 in which said urea derivative is a uracil.

8. The resinous reaction product set forth in claim 4 in which said urea derivative is a barbituric acid.

9. The process set forth in claim 1 in which said urea derivative is uracil.

10. The process set forth in claim 1 in which said urea derivative is 5-methylhydrouracil.

11. The process set forth in claim 1 in which said urea derivative is barbituric acid.

12. The resinous reaction product set forth in claim 4 in which said urea derivative is uracil.

13. The resinous reaction product set forth in claim 4 in which said urea derivative is 5-methylhydrouracil.

14. The resinous reaction product set forth in claim 4 in which said urea derivative is barbituric acid.

RALPH A. JACOBSON.